(12) United States Patent
McNaught et al.

(10) Patent No.: US 12,275,524 B2
(45) Date of Patent: Apr. 15, 2025

(54) RIB MOUNTING ASSEMBLY

(71) Applicant: AIRBUS OPERATIONS LIMITED, Bristol (GB)

(72) Inventors: Allan David McNaught, Bristol (GB); Robert McCormick, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 550 days.

(21) Appl. No.: 17/310,257

(22) PCT Filed: May 26, 2020

(86) PCT No.: PCT/EP2020/064485
§ 371 (c)(1),
(2) Date: Jul. 27, 2021

(87) PCT Pub. No.: WO2020/239715
PCT Pub. Date: Dec. 3, 2020

(65) Prior Publication Data
US 2022/0135203 A1  May 5, 2022

(30) Foreign Application Priority Data

May 28, 2019 (GB) .................................... 1907485

(51) Int. Cl.
*B64C 3/18* (2006.01)
*B64C 7/00* (2006.01)
*B64F 5/10* (2017.01)

(52) U.S. Cl.
CPC .............. *B64C 3/187* (2013.01); *B64C 3/185* (2013.01); *B64C 7/00* (2013.01); *B64F 5/10* (2017.01)

(58) Field of Classification Search
CPC ........ B64C 3/187; B64C 3/185; B64D 37/005
See application file for complete search history.

(56) References Cited

U.S. PATENT DOCUMENTS

| 2,816,686 A | * | 12/1957 | Bradford | .............. | B64D 37/005 |
| | | | | | 220/681 |
| 8,167,245 B1 | | 5/2012 | Koehler et al. | | |
| 11,560,213 B2 | * | 1/2023 | Vilas Boas | .......... | B64D 37/005 |

(Continued)

FOREIGN PATENT DOCUMENTS

| CN | 109 305 328 | 2/2019 |
| EP | 2 641 830 | 9/2013 |

(Continued)

OTHER PUBLICATIONS

International Search Report for PCT/EP2020/064485, mailed Sep. 3, 2020, 4 pages.

(Continued)

*Primary Examiner* — Assres H Woldemaryam
*Assistant Examiner* — Anna L. Gordon
(74) *Attorney, Agent, or Firm* — Nixon & Vanderhye P.C.

(57) ABSTRACT

A rib mounting assembly for an aircraft is disclosed including a rib post and a seal member. The rib post has a rib post foot to mount with a longitudinal spar and a rib post web upstanding from the rib post foot. The seal member has a seal body and a mounting flange. The mounting flange is mounted with the rib post foot and the seal body extends from an end of the rib post.

20 Claims, 7 Drawing Sheets

(56) References Cited

U.S. PATENT DOCUMENTS

2010/0107513 A1* 5/2010 Buchanan ................ B64C 3/18
                                                                               52/84
2016/0355273 A1* 12/2016 Perez Diaz ............... B64C 3/34
2020/0031489 A1* 1/2020 Edwards .............. B64D 37/005

FOREIGN PATENT DOCUMENTS

| EP | 3 210 882 | | 8/2017 | | |
|---|---|---|---|---|---|
| EP | 3208187 | A1 * | 8/2017 | ............ | B29C 35/02 |
| EP | 3 483 073 | | 5/2019 | | |
| JP | 4574086 | B2 * | 11/2010 | ............... | B64C 3/20 |

OTHER PUBLICATIONS

Written Opinion of the ISA for PCT/EP2020/064485, mailed Sep. 3, 2020, 7 pages.
Combined Search and Examination Report for GB1907485.5, mailed Nov. 11, 2019, 6 pages.

\* cited by examiner

RIB MOUNTING ASSEMBLY

CROSS REFERENCE TO RELATED APPLICATIONS

The present application is a National Phase of International Application Number PCT/EP2020/064485 filed May 26, 2020, which designated the U.S. and claims priority benefits from Great Britain Application Number GB 1907485.5 filed May 28, 2019, the entire contents of each of which are hereby incorporated by reference.

FIELD OF THE INVENTION

The present invention relates to a rib mounting assembly for an aircraft. The present invention also relates to a rib-spar joint of an aircraft, a seal member for covering a gap between a rib configuration, a spar and a cover of an aircraft, an aircraft and a method of sealing a rib for an aircraft.

BACKGROUND OF THE INVENTION

A wing of an aircraft typically includes a torsion box comprising upper and lower aerofoil covers (or skins) on either side of a structural frame comprising spanwise spars and chordwise ribs. At least one spar is provided for each wing, although two or more is more common. In an aircraft wing, the torsion box is commonly known as a wing box. The covers may also be reinforced with stringers, which extend generally spanwise.

The ribs within the wing box separate the wing box into different chambers. It is known to use at least some of these chambers as fuel tanks. Other chambers may be used as dry chambers. As such, it is known to seal ribs to fluidly isolate different chambers. Traditionally, following the assembly of the major components of the wing box, seal plates are manually fixed over any gaps formed in a rib to be sealed or fixed between the rib and any other components, such as the spar and/or covers to be sealed.

To seal a gap, an appropriately sized seal plate is selected to cover the gap to be sealed and the seal plate is then affixed to the rib itself to extend over the gap. The seal plate covers the gap and a durable sealant is adhered around the seal plate to seal the gap. The operation of fitting seal plates to cover gaps leads to additional assembly time and requires access to the interior of the wing box following assembly of the major wing box components.

SUMMARY OF THE INVENTION

According to an aspect of the invention, there is provided a rib mounting assembly for an aircraft, comprising: a rib post having a rib post foot for mounting to a longitudinal spar and a rib post web upstanding from the rib post foot; and a seal member having a seal body and a mounting flange; wherein the mounting flange is arranged to be mounted with the rib post foot; and wherein the seal body is configured to extend from an end of the rib post.

As such, the seal member is easily assembled with the rib post. With this configuration, the seal member may be assembled together with the rib post without the need for a further assembly step.

The seal member may be allowed to float relative to the rib post during mounting of the rib. The seal member may be able to float about rib post fasteners. When the rib is fixed to the spar, the rib post may then be held in position. The rib post fasteners may be used to limit movement of the seal member. The seal member may overlap the rib post. The seal member may be configured to have a shape corresponding to an inner surface of one or more components.

The seal member may be configured to be movable relative to the rib post during mounting of the rib post to the spar. As such, correct location of the seal member may be easily achieved.

The assembly may be configured to constrain movement of the seal member relative to the rib post during mounting of the rib. With this arrangement, correct alignment of the seal member during assembly may be achieved.

The rib post may comprise a guide recess configured to at least partially receive the mounting flange The rib mounting assembly may comprise a fastener configured to mount the rib post foot and mounting flange to the longitudinal spar.

The fastener may be configured to extend through the rib post foot and the mounting flange.

The mounting flange may comprise a guide slot through which the fastener extends so that the seal member is movable about the fastener during mounting of the rib. As such, movement of the seal member may be constrained to aid alignment. The seal member may be easily aligned and fixed together with mounting the rib.

The fastener may be configured to clamp the rib post and mounting flange with the longitudinal spar. The rib post and seal member may therefore be straightforwardly mounted, therefore minimising assembly time and complexity. The number of components in the assembly may be minimised.

The mounting flange may be configured to be received between the rib post and the longitudinal spar. The mounting flange may be arranged to be sandwiched between the rib post and the longitudinal spar.

The mounting flange may be configured to be received on an opposing side of the rib post foot to the longitudinal spar.

The seal body may be configured to overlap a side of the rib post web. As such, an indirect path is formed across the plane of the rib post web at the juncture with the seal member. The seal body may comprise a seal plate with a first portion configured to cover a gap at the end of the rib post web, and a second portion configured to overlap the rib post web. The second portion may be offset from the first portion.

The seal body may comprise a sealing face. The seal body may comprise a flanged portion, and the flanged portion may define the sealing face.

A sealant receiving channel may be received in the sealing face. The channel helps ensure a quantity of sealant between the sealing face and a component against which the sealant face abuts.

The seal body may comprise a spacer to space the sealing face from the longitudinal spar. As such, the spacer helps ensure a minimum thickness of a sealant material.

The sealing face may comprise a curved region.

The sealing face may comprise a first seal region configured to align with a surface of the longitudinal spar and a second seal region configured to align with a surface of an aerofoil cover.

The seal body may comprise a seal plate configured to overlap the rib post web, and the mounting flange may be configured to overlap the rib post foot.

The seal member may be a first seal member and the assembly may comprise a second seal member having a seal body and a mounting flange; wherein the seal body of the second seal member may be configured to extend from another end of the rib post; and wherein the mounting flange of the second seal member may be configured to be mounted with the rib post foot.

The rib post foot may extends to one side of the rib post web such that the rib post is L-shaped, and the mounting flange may extends in the same direction as the rib post web, such that the rib mounting assembly is configured to be present on only one side of a rib mounted by the rib mounting assembly According to an aspect of the present invention, there is provided a rib-spar joint of an aircraft comprising: a longitudinal spar; an aerofoil cover; a rib configuration extending from the spar; and a seal member covering a gap formed at a juncture of the spar, the rib configuration and the cover; wherein the seal member comprises a seal body covering the gap and a mounting flange mounted with the spar and arranged to be movable relative to the spar during assembly of the rib-spar joint.

The spar and cover may be integrally formed from a composite laminate material to form a spar-cover such that the composite material of the spar extends continuously into the cover through a fold region created between the spar and the cover. The gap may be at least partially formed by the fold region.

The spar-cover may be Z-shaped. The spar-cover may be omega-shaped.

The spar may comprise a spar web and a spar flange integrally formed from a composite laminate material such that the composite material of the spar web extends continuously into the spar flange through a fold region created between the spar web and the spar flange. The gap may be at least partially formed by the fold region.

The rib-spar joint may comprise a sealant between the seal member and at least one of the spar, the rib and the cover.

According to an aspect of the present invention, there is provided a seal member for covering a gap between a rib configuration, a spar and a cover of an aircraft, the seal member comprising: a seal body arranged to cover the gap, and a mounting flange extending from the seal body; wherein the mounting flange is configured to overlap and mount with a rib configuration foot, and the seal body is configured to extend from a rib configuration web to cover the gap.

According to an aspect of the present invention, there is provided an aircraft comprising a rib mounting assembly as described above. According to an aspect of the present invention, there is provided a rib-spar joint of an aircraft as described above. According to an aspect of the present invention, there is provided a seal member for covering a gap between a rib configuration, a spar and a cover of an aircraft as described above.

According to an aspect of the present invention, there is provided a method of sealing a rib for an aircraft, comprising: assembling the rib to a longitudinal spar with a rib post assembly, the rib post assembly comprising a rib post and a seal member configured to cover a gap between the rib, the spar and an aerofoil cover; using at least one fastener to mount the rib post and seal member on the spar with the seal member in a movable condition; locating the seal member to cover the gap; using the at least one fastener to fix the seal member with the rib post and the spar.

The method may comprise applying a curable sealant around the seal member, and curing the sealant to seal the gap.

The seal member may be fixed with the rib post and the spar with the aerofoil cover removed, and the method may comprise attaching the cover to the longitudinal spar following the at least one fastener being used to fix the seal member in position.

Reference to the fold region refers to an angle or out-of-plane curvature formed between the spar and cover. The fold region may be a sharp vertex or a smoothly blended arcuate corner.

Reference to longitudinal spar refers to a spar running along the length of the wing in a substantially spanwise direction from the wing root to the wing tip. The longitudinal spar may be substantially perpendicular to the longitudinal axis of the fuselage, although may be slightly inclined to the fuselage longitudinal axis due to, for example, the aspect ratio, twist or sweep of the wing.

Reference to terms such as upper, lower, leading edge, and trailing edge are used in reference to conventional terminology of aircraft. For instance, upper cover refers to the cover on the side of the wing in which the lift component is directed.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
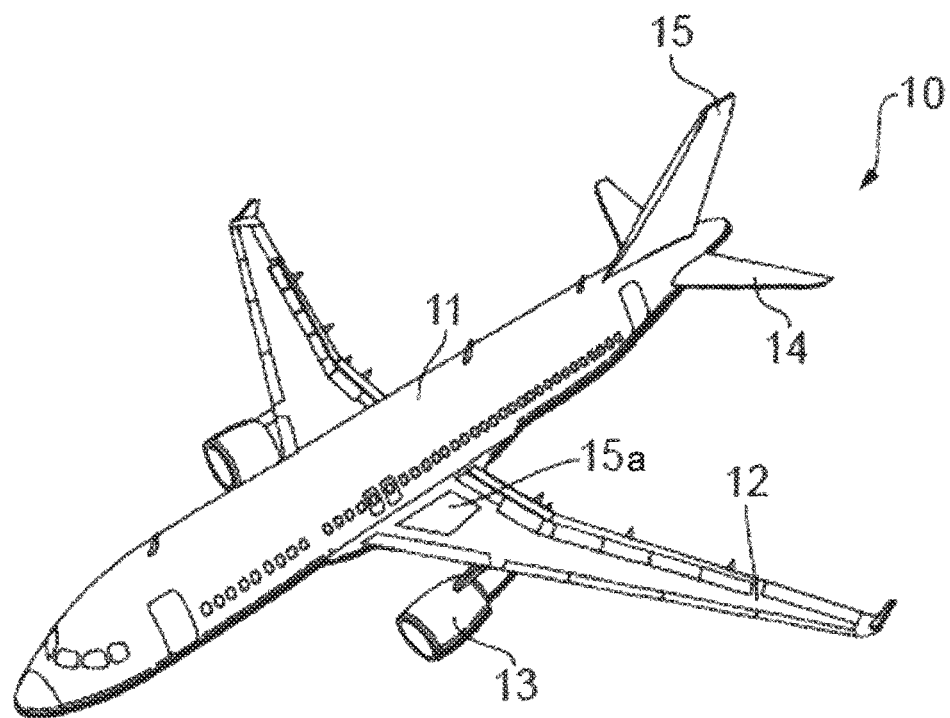
FIG. 1 illustrates a perspective view of a fixed wing aircraft.

FIG. 1 illustrates a typical configuration for a fixed wing passenger transport aircraft 10. The aircraft 10 comprises a fuselage 11, wings 12, engines 13, and horizontal and vertical tail planes 14, 15. It will be appreciated that this invention is applicable to a wide variety of aircraft types not just that illustrated in FIG. 1. For example, the aircraft may be for commercial or military purposes, may be for transporting passengers or cargo, may have jet, propeller or other engine propulsion systems, may have a variety of fuselage/wing configurations, e.g. a high wing, low wing, or blended wing body, and may be designed to fly at subsonic, transonic or supersonic speeds. Although the present invention is described by reference to a wing, it will be understood that the present invention may be applicable to other aerofoil shaped bodies, such a tail planes.

Figure 2:
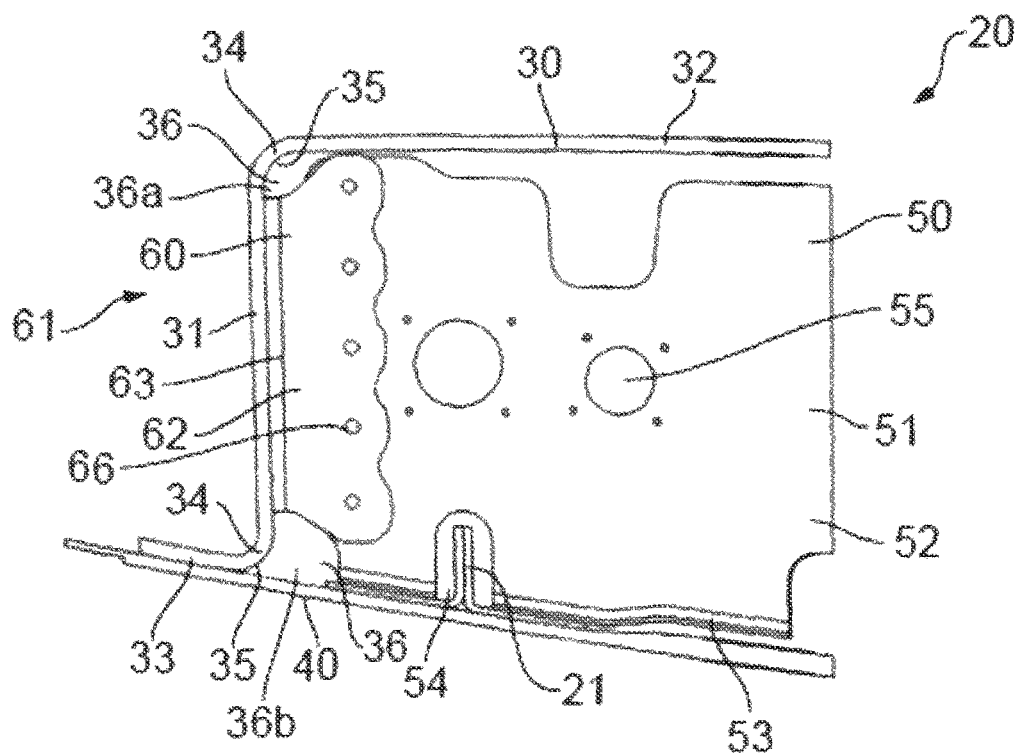
FIG. 2 illustrates a cut-away side view of part of a wing box showing a Z-shaped spar-cover, a lower cover, and a rib assembly.

Each wing 12 is formed as an aerofoil shaped body. Similarly, the horizontal and vertical tail planes 14, 15 are similarly arranged. Each wing 12 includes a torsion box, otherwise known as a wing box. Part of the wing box 20, a forward end, is shown in FIG. 2. Fuel tanks 15a are formed in each wing 12.

FIG. 2 shows a cross sectional side view of a forward end of the wing 12 of the aircraft 10. The wing 12 comprises a spar-cover component 30, a lower cover 40 and rib configurations 50. One rib configuration 50 is partly shown in FIG. 2, although it would be understood that the wing 12 will include a plurality of chordwise rib configurations 50 extending between spars and covers. The wing will typically also include a rear spar (not shown), stringers (of which one stringer 21 is shown), and leading edge and trailing edge structures (not shown). The stringers 21 are of conventional type and so will not be described in further detail. The stringers 21 reinforce the covers, acting as spanwise extending reinforcing members, which are attached to the inside of the covers.

The spar-cover component 30 comprises a front spar 31, an upper cover 32 and a lower spar flange 33. The spar-cover 30 is an integrally formed, monolithic component comprising the upper cover 32, the front spar 31, and the lower spar flange 33. The lower spar flange 33 acts as an attachment flange for mounting with the lower cover 40. The spar-cover component 30 comprises fibre reinforced matrix composite laminate material, such as carbon fibre reinforced polymer.

The composite laminate material of the spar-cover component 30 extends continuously from the upper cover 32 into the front spar 31, and into the lower spar flange 33. A fold region 34 is created between the upper cover 32 and the front spar 31. Another fold region 34 is created between the front spar 31 and the lower spar flange 33. The fold region 34 is curved. Each fold region 34 has a curved inner surface 35 on an inner side of the wing box 20.

Each fold region 34 is at a juncture between one of the spars and one of the covers. Although as described herein the front spar 31 and upper cover 32 are formed as an integral spar-cover component, it will be understood that the front spar 31 and upper cover 32 may be separate components which are assembled together. Two or more of each of the front and rear spars and upper and lower covers may be integrally formed, or separately formed and assembled together. Usually these components comprise fibre reinforced matrix composite laminate material, such as carbon fibre reinforced polymer.

The juncture between the upper cover 32 and the front spar 31 has a concave curved inner surface 35. The lower spar flange 33 extends in a forwards direction from the front spar 31. The juncture of the front spar 31 and lower spar flange 33 has a convex curved inner surface 35. It will be understood that the lower spar flange 33 may extend in a rearward direction from the front spar 31. As can be seen from FIG. 2, the spar-cover component 30 is substantially Z-shaped. The Z-shaped component has a first limb corresponding to the cover, a second limb corresponding to the front spar, and a third limb corresponding to the spar flange for attachment to another component. In another arrangement, the spar-cover component is substantially Omega-shaped. The Omega-shaped component has a first limb corresponding to the cover, forward and rearward second limbs corresponding to front and rear spars respectively, and forward and rearward third limbs corresponding to front and rear spar flanges 33a, 33b. In an alternative arrangement, the spar and covers may be separate, and assembled together (for example the arrangement shown in FIGS. 5 and 6) in which the spar has upper and lower spar flanges which are assembled with upper and lower covers respectively.

Figure 5:
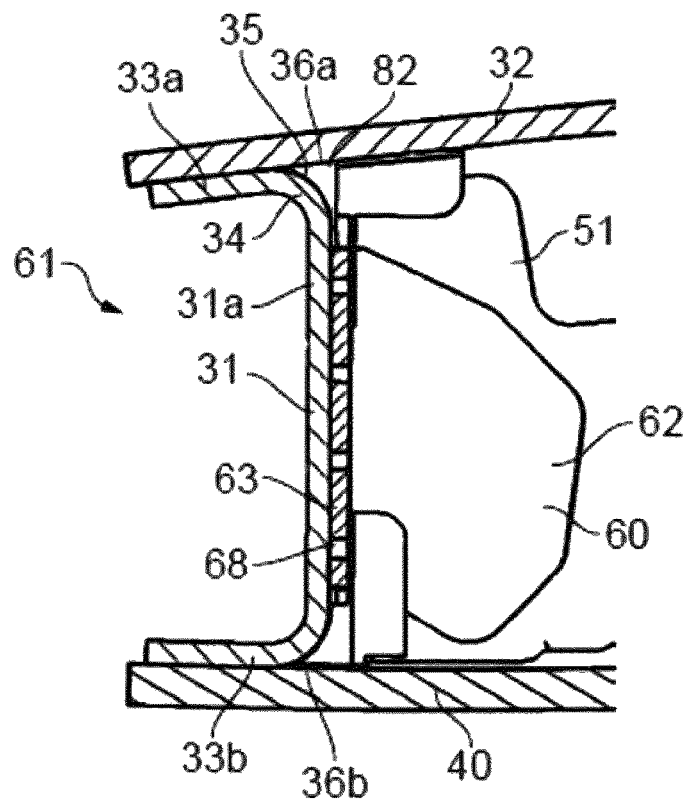
FIG. 5 illustrates a cross sectional side view of a variant of the part of the wing box assembly in which the spar is C-shaped with upper and lower covers.
Figure 6:
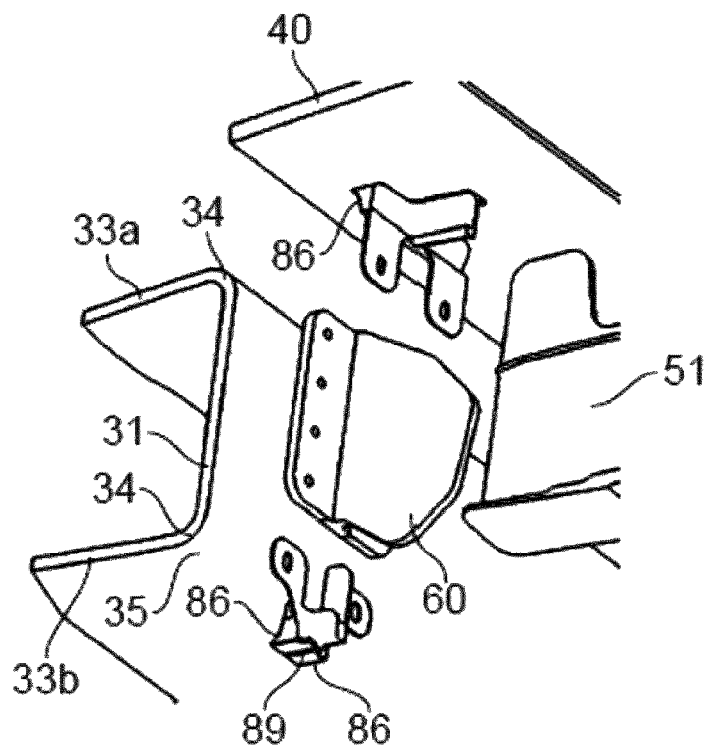
FIG. 6 illustrates the part of the wing box assembly of FIG. 5 in an exploded cross-sectional view.

In FIGS. 5 and 6, the upper and lower spar flanges 33a, 33b extend forwards, however it would be understood that the upper and lower spar flanges 33a, 33b may extend rearwards in an alternative arrangement. Although the description herein is predominantly with respect to the front spar assembly, it will be understood that the invention is applicable to the rear spar configuration, and/or any intermediate spar configuration.

The rib configuration 50 extends in a chordwise direction of the wing box 20. The rib configuration 50 extends between the front spar 31 and the rear spar (not shown), and between the upper cover 32 and lower cover 40. The rib configuration 50 includes a rib 51 and a rib post 60. The rib post 60 at the forward end attaches the rib 51 to the front spar 31. A corresponding rib post 60 at the rearward end of the rib 51 attaches the rib 51 to the rear spar (not shown). The one or more of the rib posts 60 may be integrally formed with the rib 51. The rib 51 comprises fibre reinforced matrix composite laminate material, such as carbon fibre reinforced polymer. Although components are described herein as being formed from fibre reinforced matrix composite laminate material, such as carbon fibre reinforced polymer, it will be understood that alternative materials may be used.

The rib 51 includes a rib web 52. The rib web 52 defines the general plane of the rib 51. Rib feet 53 mount the rib 51 to the upper and lower covers 32, 40. The rib feet 53 are shown herein as integrally formed with the rib web 52. However, the rib feet 53 may be formed as separate components which are attached to the rib web 52. The ribs, stringers and other components may be attached or co-cured to the upper and lower covers 32, 40.

The stringers 21 extend through mouseholes 54 in the rib 51. Other components, such as pipes (not shown) extend through apertures 55. The mouseholes 54 and apertures 55 are sealed by conventional means, such as by seal plates attached to the rib web, and so further description will be omitted herein.

The rib post 60 forms part of a rib mounting assembly 61. The rib post 60 attaches the rib 51 to the front spar 31. The rear rib post (not shown) attaches the rib 51 to the rear spar (not shown). The front rib post 60 extends forward of the rib 51. The rib post 60 extends between the rib 51 and the front spar 31. The rib post 60 extends from the rib 51, spaced from the upper and lower covers 32, 40. A gap 36 is formed at each juncture of the spars and covers. An upper gap 36a is defined between the rib 51, the rib post 60, the front spar 31 and the upper cover 32. A lower gap 36b is defined between the rib 51, the rib post 60, the spar 31 and lower cover 40. With the present arrangement, each gap 36 is at least partly defined by the curved inner surface 35.

Figure 3:
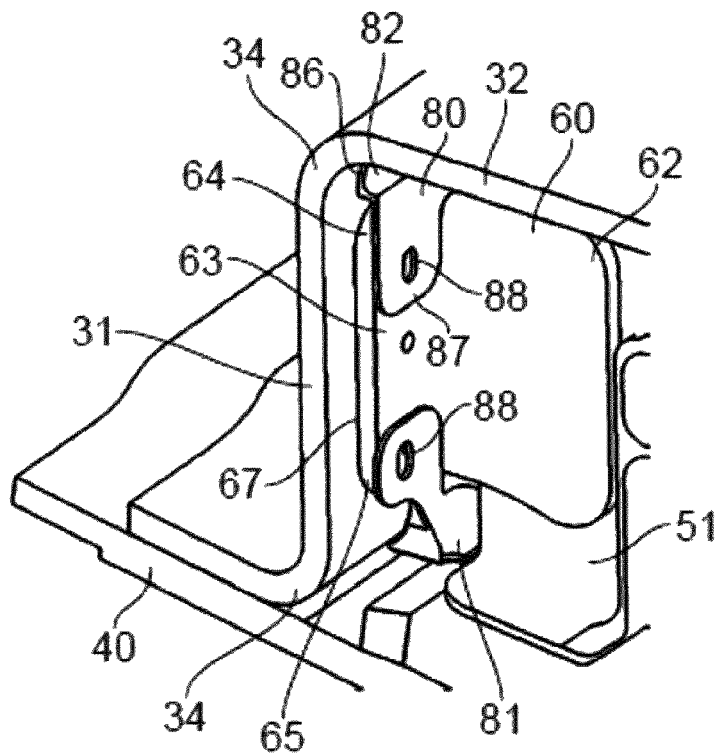
FIG. 3 illustrates a perspective cross-sectional view of the part of the wing box assembly including upper and lower seal members.
Figure 4:
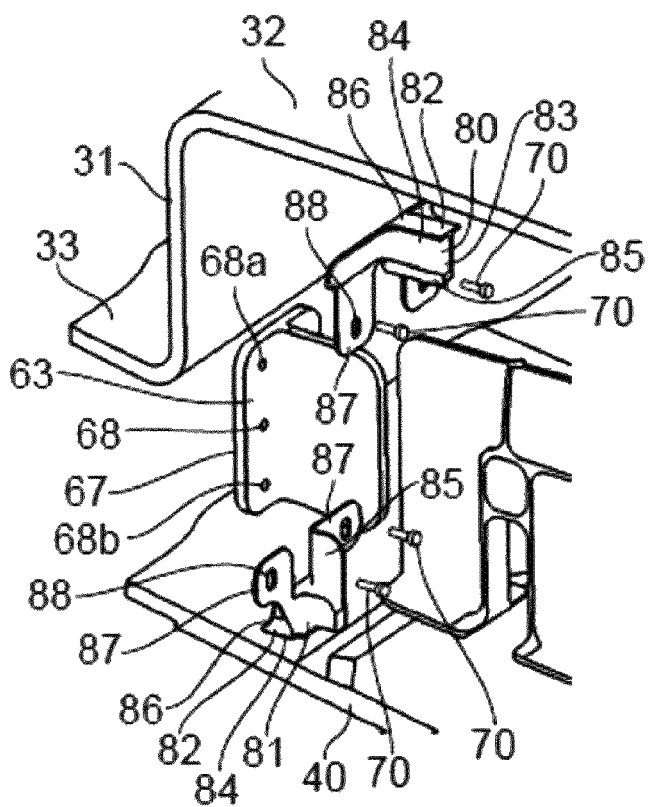
FIG. 4 illustrates an exploded cross-sectional perspective view of the part of the wing box assembly shown in FIG. 3.

Referring now for FIGS. 3 and 4, the rib post 60 includes a rib post web 62 and a rib post foot 63. The rib post web 62 upstands from the rib post foot 63. The rib post foot 63 extends either side of the rib post web 62. The rib post 60 is substantially T-shaped, however it will be understood that alternative shapes are possible, for example L-shaped. The rib post 60 has an upper end 64 and a lower end 65. The upper and lower ends 64, 65 define the ends of the rib post web 62 and rib post foot 63. The rib post web 62 extends transversely from the rib post foot 63. The rib post web 62 is fixedly mounted to the rib 51. Fixings 66 (refer to FIG. 2) fix the rib post web 62 with the rib 51. The fixings 66 are conventional and may include rivets, a bonding, and/or bolts. The rib post web 62 overlaps the rib 51 and is fixed in an overlapping arrangement.

The rib post 60 is attached to the inner side of the front spar 31. The rib post foot 63 has an attachment face 67 to attach with the spar 31. Fasteners 70, such as rivets or threaded fasteners, are received through fastening holes 68 in the rib post 60. The fastening holes 68 extend through the rib post foot 63. The fastening holes 68 extend from a rear side of the rib post foot 63 to the attachment face 67. Each fastening hole 68 is configured to correspond to one of the respective fasteners 70. The fastening holes 68 are distributed along the rib post foot 63. Upper fastening holes 68a are at the upper end 64 of the rib post 60. Lower fastening holes 68b are at the lower end 65 of the rib post 60. When the wing box 20 is assembled, the fasteners 70 fixedly mount the rib post 60 with the front spar 31.

Seal members 80, 81 are disposed at each end of the rib post 60. An upper seal member 80 is at the upper end 64 of the rib post 60 and a lower seal member 81 is at the lower end 65 of the rib post 60. Each of the seal members 80, 81 is configured to seal a corresponding one of the gaps 36 at the juncture of the spars, covers and ribs. The upper seal member 80 is arranged to seal the upper gap 36a. The lower seal member 81 is configured to seal the lower gap 36b. Each seal member 80, 81 has a seal body 82. The seal body 82 is arranged to cover the corresponding gap 36. The seal body 82 includes a seal plate 83. The seal plate 83 overlaps the rib post web 62 when assembled with the rib post 60. The seal plate 83 includes a cover part 84 which is configured to extend over the gap 36. An overlap part 85 extends from the cover part 84. The overlap part 85 is configured to overlap the end of the rib foot 60. In the present arrangement the overlap part 85 is offset from the plane of the cover part 84. This offset allows the cover part 84 to extend substantially co-planar with the rib post web 62. The offset arrangement also provides an indirect flow path between the seal body 82 and the rib post web sealing.

The seal body 82 includes a sealing face 86. The sealing face 86 is arranged to be located with respect to the spar-cover component 30 to aid sealing between the seal member 80 and the spar-cover component 30. The profile of the sealing face 86 corresponds substantially to the profile of the inner side of the spar cover component 30, proximal the fold region 84. The sealing face 86 is formed by a flanged part of the sealing body 82. The flanged arrangement forming the sealing face 86 increases the surface area of the sealing face 86.

The sealing face 86 of the seal body 82 includes a curved portion corresponding to the curved inner surface 35 of the fold region 34. The sealing face 86 also includes planar portions corresponding to planar surfaces extending from the fold region 34 of the spar-cover component 30. It will be understood that the configuration of the seal body 82 will differ dependent on the configuration of the gap 36 to be covered. For example, in the arrangement shown in FIGS. 3 and 4, the upper seal member 80 has a convex portion of the sealing face 86 to correspond with the upper curved surface 35, and the lower seal member 81 has a concave portion of the sealing face 86 corresponding with the lower curved surface 35.

Mounting flanges 87 extend from the seal body 82. As shown in the embodiment of FIGS. 3 and 4, the seal members 81, 82 each have two mounting flanges 87. However, it will be understood that the number of mounting flanges may differ. For example, the seal members as described below with reference to FIGS. 8 to 13 each have a single mounting flange 87. The mounting flanges 87 protrude from the seal plate 83. Each mounting flange 87 of the seal member 80, 81 extends generally perpendicular to the seal plate 83. The seal plate 83 is configured to cover the gap 36 extending substantially in the plane of the rib 51. The mounting flange 87 is configured to extend in a plane substantially parallel to the rib post foot 63. The seal plate 83 and mounting flange 87 extend substantially transverse to each other. Each mounting flange 87 is configured to overlap the end of the rib post foot 63. Each mounting flange 87 is offset from the sealing face 86 to allow the sealing face 86 to extend substantially co-planar with the attachment face 67 of the foot 63 when the seal member 80, 81 is assembled with the rib post 60. The two mounting flanges 87 are spaced apart by a recess to receive the rib post web 62 there between. Each mounting flange 87 has a guide slot 88. The guide slot 88 extends through the mounting flange 87. The number of guide slots 88 may differ. The longitudinal axis of the guide slot 88 extends in the direction of the seal plate 83. The guide slots 88 are configured to align with a corresponding fastening hole 68 when the rib post and seal member are assembled.

Assembly of the wing box 20 will now be described. The rib posts 60 are assembled with the rib 51. The rib posts 60 are fixedly mounted with the rib 51. The rib configuration 50 including the rib 51 and rib post 60 are brought together with the spar-cover component 30. The upper seal member 80 is positioned at the upper end 64 of the rib post 60 and the lower seal member 81 is positioned at the lower end 65 of the rib post 60. Fasteners 70 are received through the guide slots 88 of the upper seal member 80 and received through the upper fastening holes 68a at the upper end 64 of the rib post foot 63. The fasteners 70 are mounted with the front spar 31. As such, the fasteners 70 mount the upper seal member 80, rib post 60 and front spar 31 together.

The fasteners 70 are initially in a loose condition as the assembly is assembled. As such, the upper seal member 80 is able to slide relative to the rib post 60 by the fasteners 70 sliding in the guide slots 88. The upper seal member 80 is therefore positionable relative to the rib post 60 and the front spar 31 and upper cover 32 to cover the upper gap 36a. When the components are correctly located the fasteners 70 are tightened into a fixed condition to fixedly mount the upper seal member 80 with the rib post 60 and spar-cover component 30. As such, the upper gap 36a may be effectively covered. During assembly, either prior to fixedly mounting the components relative to each other or following fixing of the fasteners 70 a curable sealant is applied around the seal member 80. The curable sealant is applied to the sealing face 86 and to the overlap part 85. Subsequent to fixing, the curable sealant is allowed to cure to seal the upper gap 36a.

To seal the lower gap 36b, the lower seal member 81 is assembled at the lower end 68b of the rib post 60 together with the spar-cover component 30. The fasteners 70 are received through the guide slots 88 in the mounting flanges 87 of the lower seal member 81 and through the lower fastening holes 68b in the lower end 65 of the rib post foot 63. The fasteners 70 are mounted in a loose condition during assembly to allow the lower seal member 81 to slide relative to the rib post 60. A respective portion of the sealing face 86 is arranged to locate with the lower cover 40 and is aligned with the plane of the inner surface of the lower cover 40. The fasteners 70 are then tightened into a fixedly mounted position. This alignment may be achieved in different means, including by moving the lower cover into position and tightening the fasteners 70. A curable sealant is applied around the lower seal member 81 and the lower cover 40 is brought into position with the spar-cover component 30. The curable sealant is allowed to cure to seal the lower gap 36*b*.

Figure 7:
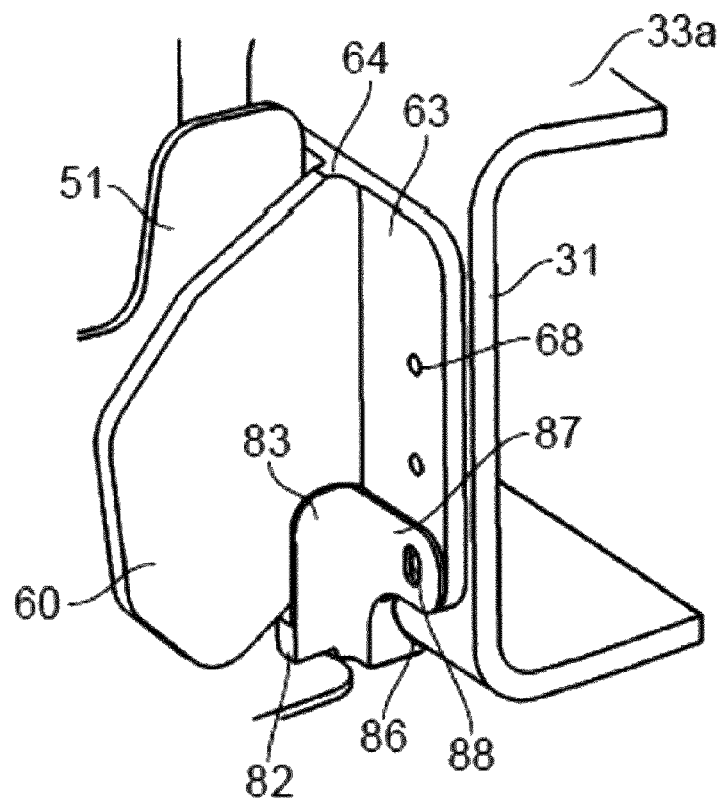
FIG. 7 illustrates a perspective view of the variant of FIGS. 5 and 6 with the upper and lower covers omitted.
Figure 8:
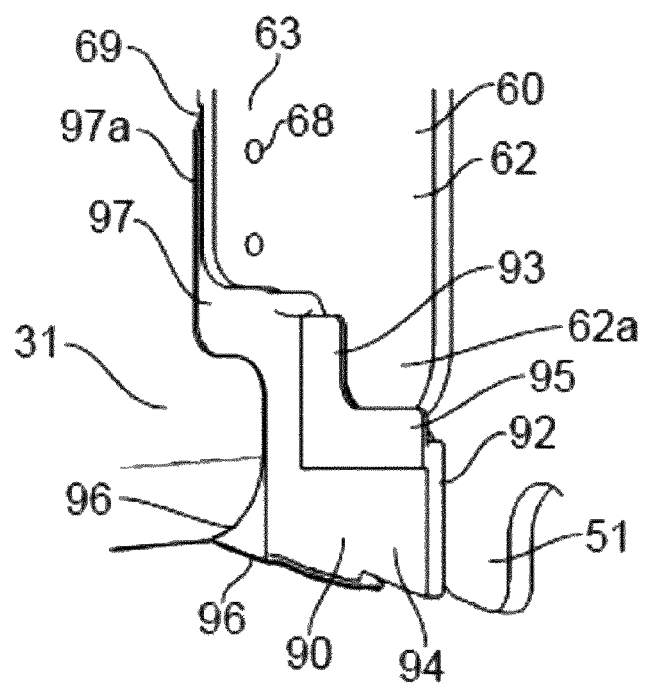
FIG. 8 illustrates a perspective view of a variant of a seal member assembled with part of a wing box assembly.
Figure 9:
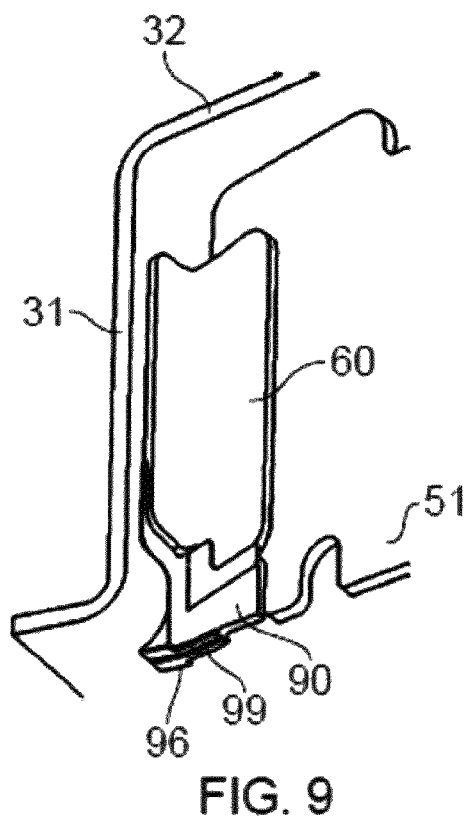
FIGS. 9 and 10 illustrate further views of the seal member of FIG. 8 assembled with part of a wing box assembly.
Figure 10:
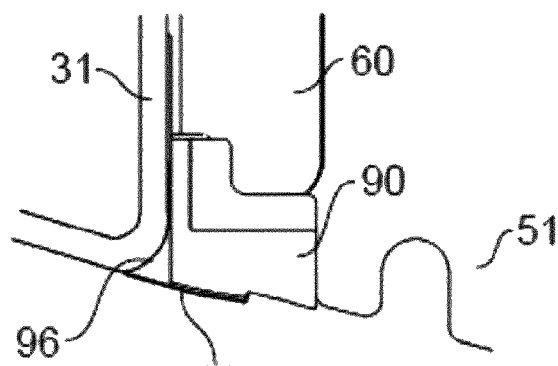
Figure 11:
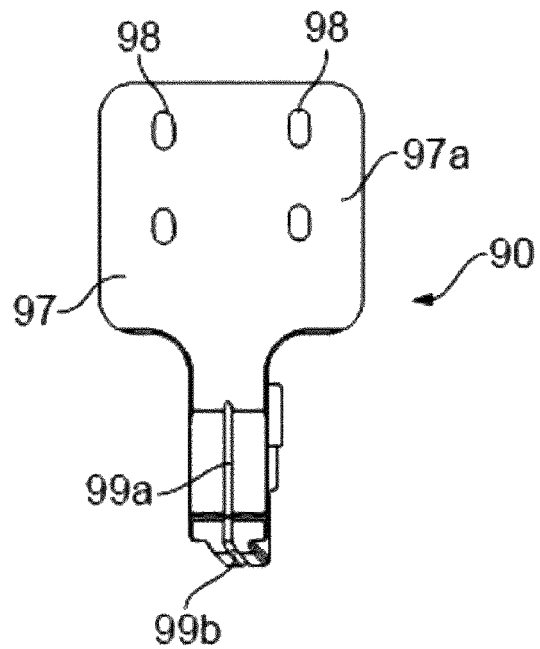
FIG. 11 illustrates a perspective view of the seal member shown in FIGS. 8 to 10.
Figure 12:
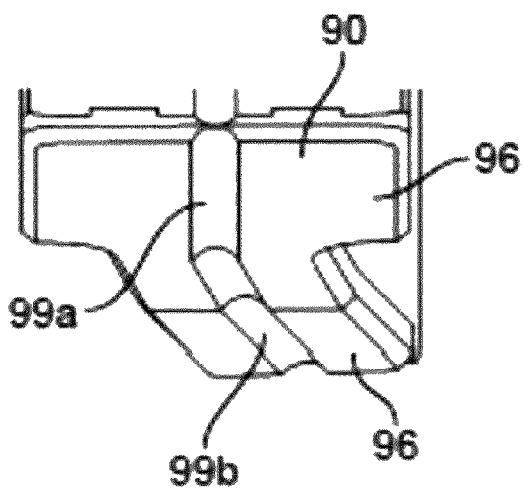
FIG. 12 illustrates a close up of part of a seal member.

The fasteners 70 clamp the rib post 60 and mounting flanges 87 of the seal members 80, 81 with the front spar 31. The mounting flanges 87 are received on an opposing side of the rib post foot 63 to the front spar 31. As such, the rib post foot 63 is sandwiched between the mounting flanges 87 and the front spar 31. It will be understood that alternative configurations are anticipated. For example, an alternative arrangement is shown in FIGS. 5 to 7. In this alternative arrangement, the front spar 31 is separate from the upper cover 32. The front spar 31 is C-shaped with a spar web 31*a*, and the upper and lower spar flanges 33*a*, 33*b*. The upper cover 32 is attached with the upper spar flange 33*a* and the lower cover 40 is attached with the lower spar flange 33*b*. The rib post 60 also has a different profile. In particular, the rib post web has a plurality of edge portions.

The rib mounting assembly 61 includes the upper and lower seal members 80, 81. The upper seal member 80 covers the upper gap 36*a* and the lower seal member covers the lower gap 36*b*. The arrangement is generally the same as described above, and so a detailed description will be omitted. However, a configuration of the seal body 82 of the upper seal member 80 differs in this embodiment from that described above. In this embodiment, the front spar 31 has a fold region 34 at the upper end which forms a convex curved inner surface 35. This differs from the concave curved inner surface 35 as described above. Each of the upper and lower seal members 80, 81 have concave portions of the sealing face 86 to correspond with the profile of the gaps 36 formed at each end of the rib post 60.

A sealant receiving channel 89 is formed in the sealing face 86. The sealant receiving channel 89 extends along the sealing face 86. The sealant receiving channel 89 is configured to receive sealant along the length of the sealing face 86. The provision of the sealant receiving channel 89 in the sealing face 86 helps to ensure a thickness of sealant along a line of the sealing face 86. As such, a thickness of sealing material is maintained when the sealing face 86 is urged into abutment with surfaces of the surrounding components.

Referring now to FIGS. 8 to 11, a further embodiment of a seal member 90 will now be described. The seal member 90 generally corresponds to the arrangement of the seal members 80, 81 described above. A detailed description of the seal member 90 will be omitted. However, in this embodiment the configuration of the mounting flange differs.

The seal member 90 shown in FIGS. 8 to 11 is a lower seal member, however it will be understood that an upper seal member may have a corresponding configuration. The seal member 90 has a seal body 92 and mounting flange 97. The seal body 92 is arranged to cover the corresponding gap 36. The seal body 92 includes a seal plate 93. The seal plate 93 overlaps the rib post web 62 when assembled with the rib post 60. The seal plate 93 includes a cover part 94 which is configured to extend over the gap 36. An overlap part 95 extends from the cover part 94. The overlap part 95 is configured to overlap the end of the rib foot 60. In the present embodiment, the rib post web 62 has a protruding end portion 62*a*. The overlap part 93 has a shape configured to overlap two edges of the protruding end portion 62*a*. As such, the overlap part 93 has an L-shape configuration. Other shapes are anticipated.

The mounting flange 97 extends from the seal body 92. The mounting flange 97 is planar. The mounting flange 97 extends generally perpendicular to the seal plate 93. The mounting flange 97 is configured to be sandwiched between the rib post foot 63 and the spar 31. The mounting flange 97 has a mounting face 97*a* which locates against the spar 31. The sealing face 96 extends from the mounting face 97*a*. The sealing face 96 has a sealant receiving channel 99. The sealant receiving channel 99 extends along the sealing face 96. The sealant receiving channel 99 has multiple channel portions 99*a*, 99*b*, 99*c*, with each portion of the sealing face 96 having a corresponding channel portion.

When assembled, the rib post foot 63 at least partially extends over the mounting flange 97. The rib post foot 63 has a recess 69 arranged to receive the mounting flange 97. The recess 69 has a depth corresponding to the thickness of the mounting flange 97. The mounting flange 97 is slidable in the recess 69. The mounting flange 97, when correctly located, is clampable between the rib post foot 63 and the spar 31. This aids fixing of the seal member 90.

Fastening holes 68 in the rib post 60 correspond with guide slots 88 in the mounting flange 97. As such, these fastening holes 98 are alignable with the guide slots 98 when the mounting flange 97 is received in the recess 69. These fastening holes 98 communicate with the recess 69. The fasteners 70 protrude through recess 69, and therefore through the mounting flange 97 received in the recess 69.

Figure 13:
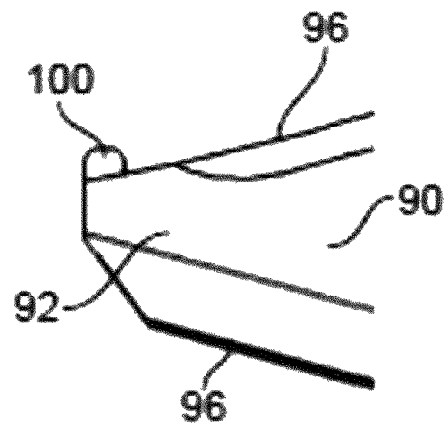
FIG. 13 illustrates a perspective view of another variant of a seal member assembled with a rib assembly.

As shown in FIG. 13, the seal body 92 has a spacer 100. The spacer 100 protrudes from the sealing face 96. The spacer 100 aids alignment of the seal member 90 with the other components. The spacer 100 acts to space the sealing face 96 from the surface of an adjacent component, and in particular the spar 31. As such, the spacer 100 helps ensure a minimum thickness of a sealant material when applied between the surfaces.

Figure 14:
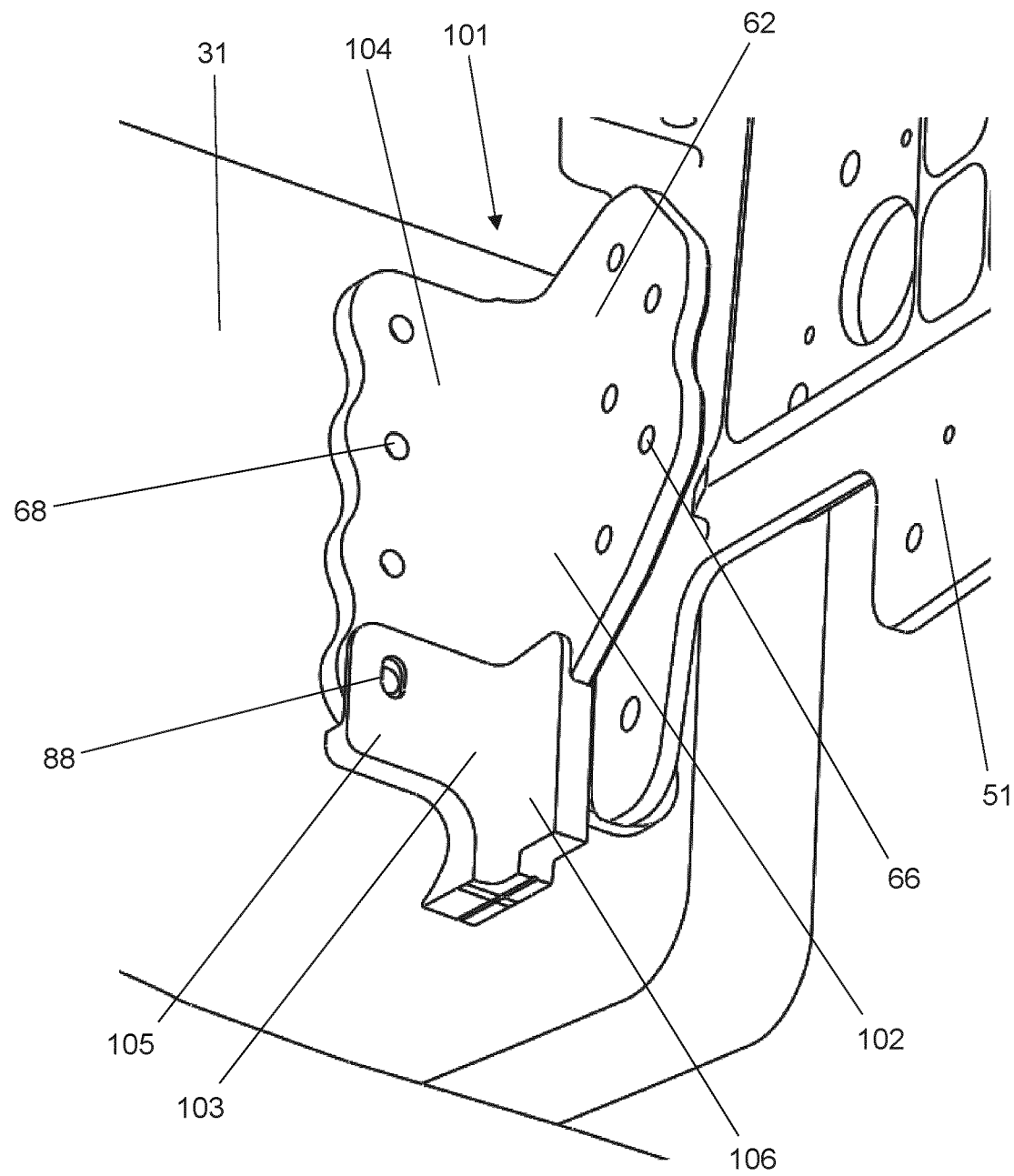
FIG. 14 illustrates a perspective view of yet another variant of a rib mounting assembly.

Referring now to FIG. 14, a further embodiment of a rib mounting assembly 101 will now be described. The rib mounting assembly 101 generally corresponds to the arrangement of the rib mounting assembly 61 described above. A detailed description of the rib mounting assembly 101 will therefore be omitted. However, in this embodiment the configuration of the rib post 102 and the seal member 103 differs from the illustrated rib post 61 and seal members 80, 81 described above. The seal member 103 shown in FIG. 14 is a lower seal member, however it will be understood that an upper seal member may have a corresponding configuration.

The rib post 102 has a rib post foot 104 which extends to only one side of the rib post web 62, such that the rib post is L-shaped. The seal member 103 has a single mounting flange 105, which extends to one side of the seal plate 106 of the seal member 103. The mounting flange 105 extends in the same direction as the rib post web. In the assembled configuration of the rib mounting assembly 101 (as shown in FIG. 14) the seal plate 106 is substantially coplanar with the rib post web 62, and each sits adjacent to and overlapping with the rib 51. The rib post foot 104 and the mounting flange 105 extend to the same side of the rib 51.

The rib mounting assembly 101 is therefore present on only one side of the rib 51. This means that access to an opposite side of the rib 51 may not be required during mounting of the rib, which may be advantageous for some applications. The rib mounting assembly 101 may also be advantageous for applications in which there is limited or no space available on one side of the rib 51, for example because it is desired to mount a component in that location.

Figure 15:
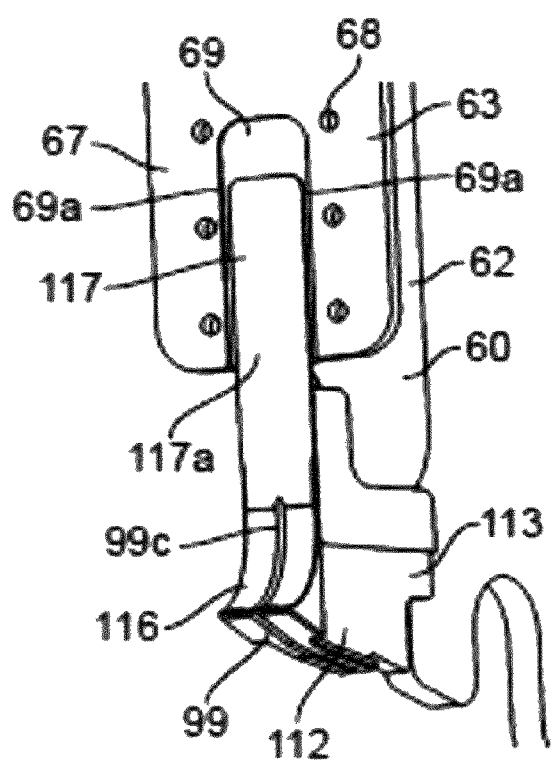
FIG. 15 illustrates a perspective view of another variant of a seal member assembled with a rib assembly.

Although in the above described embodiments, the fasteners 70 extend through the mounting flange, it will be understood that in embodiments, the mounting flange is separate from the fasteners. In such embodiments, guide slots, acting as a guide arrangement, may be omitted from the mounting flange. Referring to FIG. 15, an alternative guide arrangement is shown. The seal member 110 generally corresponds to the arrangement of the seal members 80, 81, 90 described above. A detailed description of the seal member 110 will be omitted.

The seal member 110 has a seal body 112 and mounting flange 117. The seal body 112 is arranged to cover the gap defined at the end of the rib post 60. The seal body 112 includes a seal plate 113. The mounting flange 117 extends from the seal body 112. The mounting flange 117 is planar. The mounting flange 117 extends generally perpendicular to the seal plate 113. The mounting flange 117 is configured to be sandwiched between the rib post foot 63 and the spar 31. The rib post foot 63 has an attachment face 67 to attach with the spar 31. The mounting flange 117 has a mounting face 117a which locates against the spar 31. The sealing face 116 extends from the mounting face 117a. The sealing face 116 has sealant receiving channel 99.

The rib post foot 63 has recess 69 arranged to receive the mounting flange 117. The recess 69 has a depth corresponding to the thickness of the mounting flange 17. The mounting flange 17 is slidable in the recess 69. The mounting flange 117, when correctly located, is clampable between the rib post foot 63 and the spar 31. This aids fixing of the seal member 110. The recess 69 has guide edges 69a. The guide edges 69a extend parallel to each other and define walls of the recess. The guide edges 69a abut against the mounting flange 117 to constrain movement of the mounting flange 117.

Fastening holes 68 in the rib post web 63 are disposed around the recess 69. When the assembly is assembled, the mounting flange 117 is retained between the rib post 60 and the spar 31.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft rib configuration, comprising:
    a rib comprising a rib post having a rib post foot for mounting to a longitudinal spar and a rib post web upstanding from the rib post foot; and
    a seal member having a seal body configured to cover a gap between the rib, the longitudinal spar and an aerofoil cover to prevent fluid flowing through the gap, and a mounting flange;
    wherein the seal body includes a seal plate transverse to the mounting flange;
    wherein the seal mounting flange is mounted to and overlaps with the rib post foot; and
    wherein the seal body is configured to extend from an end of the rib post.

2. The rib mounting assembly of claim 1 wherein the seal member is configured to slide to position the seal member relative to the rib post.

3. The rib mounting assembly of claim 2 wherein the assembly is configured to secure the seal member to the rib post.

4. The rib mounting assembly of claim 3, wherein the rib post comprises a guide recess configured to at least partially receive the mounting flange.

5. The rib mounting assembly of claim 1, further comprising a fastener configured to mount the rib post foot and mounting flange to the longitudinal spar.

6. The rib mounting assembly of claim 5, wherein the fastener is configured to extend through the rib post foot and the mounting flange, and wherein the mounting flange comprises a guide slot through which the fastener extends so that the seal member is movable about the fastener during mounting of the rib.

7. The rib mounting assembly of claim 1, wherein the mounting flange is configured to be received between the rib post and the longitudinal spar.

8. The rib mounting assembly of claim 1, wherein the seal body comprises a sealing face and a sealant receiving channel in the sealing face.

9. The rib mounting assembly of claim 1, wherein the seal body comprises a sealing face comprising a first seal region configured to align with a surface of the longitudinal spar and a second seal region configured to align with a surface of the aerofoil cover assembled with the longitudinal spar.

10. The rib mounting assembly of claim 1, wherein the seal member is a first seal member and the assembly comprises a second seal member having a seal body and a mounting flange; wherein the seal body of the second seal member is configured to extend from another end of the rib post; and wherein the mounting flange of the second seal member is configured to be mounted with the rib post foot.

11. The rib mounting assembly of claim 1, wherein the rib post foot extends to one side of the rib post web such that the rib post is L-shaped, and wherein the mounting flange extends in the same direction as the rib post web, such that the rib mounting assembly is configured to be present on only one side of a rib mounted by the rib mounting assembly.

12. An aircraft comprising a rib mounting assembly of claim 1.

13. The rib mounting assembly of claim 1, wherein the seal body extends from the seal mounting flange.

14. The rib mounting assembly of claim 1, wherein the rib post foot is mounted to the longitudinal spar.

15. A rib-spar joint of an aircraft comprising:
    a longitudinal spar;
    an aerofoil cover;
    a rib configuration comprising a rib having a rib post, wherein the rib post includes a rib post foot, and wherein the rib configuration extends from the spar; and
    a seal member covering a gap formed at a juncture of the spar, the rib configuration and the cover;
    wherein the seal member comprises a seal body covering the gap and a mounting flange mounted with the spar and arranged to be movable relative to the spar during assembly of the rib-spar joint;
    wherein the seal body includes a seal plate transverse to the mounting flange;
    wherein the seal mounting flange is mounted to and overlaps with the rib post foot; and
    wherein the seal body is configured to extend from an end of the rib post.

16. The rib-spar joint of claim 15, wherein the spar and cover are integrally formed from a composite laminate material to form a spar-cover such that the composite material of the spar extends continuously into the cover through a fold region created between the spar and the cover, and wherein the gap is at least partially formed by the fold region.

17. The rib-spar joint of claim 15, wherein the spar comprises a spar web and a spar flange integrally formed from a composite laminate material such that the composite material of the spar web extends continuously into the spar flange through a fold region created between the spar web and the spar flange, and wherein the gap is at least partially formed by the fold region.

18. A method of sealing a rib for an aircraft, comprising:
assembling the rib to a longitudinal spar with a rib post assembly, the rib post assembly comprising a rib post and a seal member configured to cover a gap between the rib, the spar and an aerofoil cover,
wherein the seal member comprises a seal body and a mounting flange, and wherein the seal body includes a seal plate transverse to the mounting flange;
using at least one fastener to mount the rib post and seal member on the spar with the seal member in a movable condition;
locating the seal member to cover the gap;
using the at least one fastener to fix the seal member with the rib post and the spar;
wherein the seal mounting flange is mounted to and overlaps with the rib post foot; and
wherein the seal body is configured to extend from an end of the rib post.

19. The method of claim 18, comprising applying a curable sealant around the seal member, and curing the sealant to seal the gap.

20. The method of claim 18, wherein the seal member is fixed with the rib post and the spar with the aerofoil cover removed, and the method comprises attaching the cover to the longitudinal spar following the at least one fastener being used to fix the seal member in position.

* * * * *